United States Patent [19]

Dickie et al.

[11] 4,374,213

[45] Feb. 15, 1983

[54] ALKALINE RESISTANT ORGANIC COATINGS FOR CORROSION SUSCEPTIBLE SUBSTRATES III

[75] Inventors: Ray A. Dickie, Birmingham; Joseph W. Holubka, Livonia; S. Burhan A. Qaderi, Westland, all of Mich.

[73] Assignee: Ford Motor Company, Dearborn, Mich.

[21] Appl. No.: 139,068

[22] Filed: Apr. 10, 1980

Related U.S. Application Data

[63] Continuation of Ser. No. 938,670, Aug. 31, 1978, abandoned.

[51] Int. Cl.$^3$ .............................................. C08L 63/00
[52] U.S. Cl. .................................... 523/416; 525/510; 525/511
[58] Field of Search ........... 260/834, 29.4 R, 29.2 EP, 260/39 R; 525/510, 511; 523/416

[56] References Cited

U.S. PATENT DOCUMENTS

| | | | |
|---|---|---|---|
| 3,336,253 | 8/1967 | Wong | 260/29.3 |
| 3,456,053 | 7/1969 | Enders | 260/834 |
| 3,869,366 | 3/1975 | Suzuki | 260/29.2 EP |
| 3,937,679 | 2/1976 | Bosso | 260/834 |
| 3,962,499 | 6/1976 | Brody | 260/29.2 EP |
| 3,975,346 | 8/1976 | Bosso | 260/29.2 EP |
| 4,021,503 | 5/1977 | Goulding | 260/834 |
| 4,064,090 | 2/1977 | Gibson | 260/29.4 R |
| 4,076,675 | 2/1978 | Sommerfeld | 260/29.4 UA |
| 4,076,676 | 2/1978 | Sommerfeld | 260/834 |
| 4,116,900 | 9/1978 | Belanger | 260/834 |
| 4,119,599 | 10/1978 | Woo | 525/511 |
| 4,137,213 | 1/1979 | Kempter | 525/511 |
| 4,170,579 | 10/1979 | Bosso | 260/29.2 EP |
| 4,192,929 | 3/1980 | Wingfield | 525/511 |
| 4,192,932 | 3/1980 | Dickie | 525/511 |

FOREIGN PATENT DOCUMENTS

786410 5/1968 Canada.
1423973 2/1976 United Kingdom.

*Primary Examiner*—Paul Lieberman
*Attorney, Agent, or Firm*—Roger L. May; Keith L. Zerschling

[57] ABSTRACT

Primers that are aqueous emulsions comprising (a) at least partially neutralized reaction product of di- or poly epoxy compounds and hydroxy amines made in water miscible solvents and (b) amino resin crosslinkers yield, upon curing, alkaline resistant coatings that provide corrosion protection even in absence of inhibiting pigments as chromates.

5 Claims, No Drawings

ALKALINE RESISTANT ORGANIC COATINGS FOR CORROSION SUSCEPTIBLE SUBSTRATES III

This is a continuation of application Ser. No. 938,670, filed Aug. 31, 1978, now abandoned.

BACKGROUND OF THE INVENTION

This invention relates to preventing corrosion of susceptible substrates as ferrous metals and includes, in particular, resins that retard corrosion of such substrates even when formulated in primer compositions that are free of such inhibiting pigments as chromates.

The corrosion of steel immersed in an aqueous environment can often be slowed to an acceptable rate by the introduction of corrosion inhibitors soluble in the aqueous medium. In the case of steel structures subjected intermittently to a corrosive environment, or under conditions which preclude effective incorporation of a corrosion inhibitor into the corrosive medium, protective organic coatings are often used. One of the major functions of these coatings is to act as a reservoir for sparingly soluble inorganic corrosion inhibitors which act to slow the rate of corrosion at coating defects and other incipient anodic corrosion sites. Among the most effective inhibitors are inorganic chromates whose safety has been questioned by some. While the elimination of these pigments may therefore be desirable, it is found that in the absence of effective corrosion inhibiting pigments extensive adhesion failure adjacent to coating defects and flaws can take place, resulting ultimately in the uncontrolled spread of corrosion. The principal cause of corrosion-induced adhesion failure is generally thought to be displacement and/or degradation of the coating resin by cathodically produced hydroxide ion. Corrosion inhibitors suppress this effect by slowing the overall rate of corrosion, limiting the amount of alkali produced. In the absence of corrosion inhibitors it is therefore necessary that the coating resin be exceptionally resistant to displacement and/or degradation by corrosion-produced hydroxide.

A principal objective is, therefore, the provision of resins suitable for use in organic coatings and additionally highly resistant to alkali degradation. A further objective is the provision of organic coating formulations which enable ferrous substrates to be protected from corrosion without the incorporation of possibly deleterious corrosion inhibitive pigments. It is further desired that the organic coatings be suitable for use as primers on automotive steel substrates and that the application and handling characteristics, including shelf stability, be compatible with conventional commercial paint operations and practices.

THE INVENTION

This invention relates to compositions and methods that retard corrosion of susceptible substrates in the absence of conventional amounts of inhibiting pigments as chromates and includes, especially, primer compositions adapted for use on automotive steels and other such substrates. More particularly, this invention includes crosslinking compositions that cure into coatings on bare and treated steels and resist spread of corrosion, particularly from coating surface defects.

Briefly, the crosslinking compositions include (I) the reaction product of (a) epoxy reactant and (b) amine reactant, (II) amino resin crosslinking agent, and (III) optionally, a di- or polyhydroxy compound, wherein the amine reactant comprises secondary or primary and secondary amine and, also, is mostly, on a molar basis, hydroxy amine. In an alternative embodiment, (a) and (b) need not be fully reacted prior to application onto the substrate. Surprisingly such compositions may be cured within commercially acceptable curing schedules without volatilization of the amine to provide coatings that are exceptionally resistant to degradation/displacement under corrosive conditions and may advantageously be cured at even lower temperatures in the presence of catalyst.

In one embodiment, the crosslinking compositions may be formulated into solvent-based coatings as spray primers that exhibit corrosion resistance considerably in excess of certain conventional primers. Moreover, the crosslinking compositions may be formulated into water-based primers that exhibit desirable properties.

In another embodiment, certain reactive catalysts have also been found that reduce cure temperature required for primers containing the crosslinking compositions while maintaining and improving film characteristics compared to usual catalysts.

The discovery that corrosion prevention may be accomplished in the absence of inhibiting pigments provides an alternative means of preventing corrosion that is believed to utilize a mechanism different than when inhibiting pigments as chromates are included. More particularly, available evidence indicates that cured coatings, as described more fully herein, rather than slowing the overall rate of corrosion by retarding anodic dissolution of iron as a means to retard corrosion, provide an adherent crosslinked network which is exceptionally resistant to degradation/displacement by cathodically produced hydroxide and thus limit the total area over which the corrosion reactions can occur.

DETAILED DESCRIPTION OF THE INVENTION

The essential components of crosslinking compositions of this invention include certain epoxy compounds, hydroxy amines and amino resin crosslinking agent. The components are combined in a fashion that forms the crosslinking composition useful in solvent-base and water-base primer coating compositions.

Compositional Ingredients

(A) EPOXY-AMINE REACTION PRODUCT

The epoxy amine reaction product is formed in nonaqueous medium by reacting a di or polyepoxide (that is preferably free of carboxy ether moieties linking the epoxide groups) with certain amines.

1. Epoxy Reactant—The epoxy reactant essentially should contain at least about two, on the average, epoxy groups per molecule and may contain three or more with a molecular weight preferably above about 300 (number average) and up to about 10,000 or more, depending on factors as desired viscosity and solids content.

One class of suitable epoxy compounds for the epoxy reactant include reaction products of di or polyhydric, mono, di or polycyclic compounds with epihalohydrins of the formula

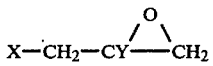

wherein X is halogen as chloro and Y is hydrogen or lower alkyl such as methyl or ethyl which epihalohydrin reaction products are exemplified by such straight chain epoxy terminated compounds containing glycidyl ether groups as bis-phenol A-epichlorohydrin reaction products that are commercially available as, for example, Epon 828, 1001 or 1004 (marketed by Shell Chemical Company). Such products contain aromatic groups as benzene nuclei at a preferred average of at least about one, more preferably for this invention at least about two, on the average, for each terminal epoxy group. Especially suitable are bis-phenol A-epichlorohydrin reaction products comprising in major amounts up to 10 or more bis-phenol moieties within the epichlorohydrin reaction product backbone, e.g. molecular weights in a range of up to about 8000, preferably 700–6000, on a number average basis.

Other examples of epoxy compounds for the epoxy reactant include polyepoxy compounds (averaging more than about two epoxy groups per molecule) which are also commercially available. In this group of epoxy compounds are the Novolac epoxy resins, e.g. Epon 152 and 154 (marketed by Shell Chemical Company). These polyepoxy resins include epoxidized products of phenol formaldehyde resins that contain terminal glycidyl ether groups from aromatic moieties.

Aliphatic including cycloaliphatic epoxy compounds having, on the average, at least about two epoxy groups per molecule may also be employed. Such aliphatic epoxy compounds include epihalohydrin and aliphatic di or polyols such as glycols reaction products, epoxidized polybutadienes, vinylcyclohexenedioxide and dipentene dioxide. Still further, hydrogenated bisphenol A epichlorohydrin products may also be employed.

Compatible mixtures of any of these epoxy compounds are also suitable.

In one preferred embodiment, the epoxy reactant comprises relatively high molecular weight (e.g. number average above about 700) epoxy compound that have hydrophobic groups (as epihalohydrin reaction products of a diol, e.g. bis phenol-A) for these have been found to advantageously further provide enhanced moisture resistance to the cured coatings as compared to lower molecular weight epoxy compounds made in this way. Alternatively, as will be more fully described hereinafter, certain lower molecular weight epoxy compounds may be reacted with primary and secondary alkanol amines to provide epoxy amine reaction products that similarly provide more desirable moisture resistance. Preferably, however, the epoxy reactant comprises higher molecular weight epoxy compounds as those bis-phenol A-epichlorohydrin reaction products that have at least about 25 mole percent (more preferably at least about 75 mole percent) of compounds that have two or more, e.g. about 3–10 aromatic groups per epoxy group.

2. Amine Reactant—The amine reactant preferably comprises secondary or primary and secondary amine desirably having a total of up to about 20 carbons per amino nitrogen and with at least about 75 mole percent of the amine reactant comprising at least one hydroxy amine having one or more (preferably two) primary hydroxy groups on carbon atoms that are not adjacent to any amino nitrogen. Secondary amines are typically suitable with higher molecular weight epoxy compounds whereas combinations of primary and secondary amines are advantageous with lower molecular weight epoxy compounds as the epoxy reactant so as to increase the molecular weight of the epoxy amine reaction product. Secondary mono-amines are normally employed with polyepoxide having three or more epoxy groups per molecule.

Hydroxy of the hydroxy amine serves as a moiety that is believed to chemically react with at least a portion of the amino resin crosslinking agent during curing so as to provide a crosslinked coating; it is preferred that the hydroxy amine have primary hydroxy attached to aliphatic carbon. Also, at least one amino nitrogen of the hydroxy amine is preferably substituted only by aliphatic carbon, i.e. hydroxy aliphatic amine, although the aliphatic carbon chain may be interrupted or substituted as with non-interferring heteroatoms as oxygen or aromatic as aryl or tertiary amine.

Hydroxy aliphatic secondary amines and, particularly hydroxy alkyl secondary monoamines are advantageous for the amine reactant in many instances, and especially desirable are hydroxy alkyl amines wherein the alkyl group is preferably lower alkyl e.g., up to 7 carbon atoms. In one preferred embodiment, the amine reactant comprises all or nearly all (e.g. 90 mole percent or greater) secondary amine that is amino alcohol and especially amino alcohol bearing two hydroxy alkyl substituents as, for example, diethanol amine.

A class of preferred hydroxy amines are illustrated according to the following formula:

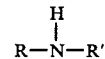

wherein R and R' are independently hydrogen or straight or branched chain aliphatic of up to about 10 carbons each providing that (a) at least one of R and R' is not hydrogen and (b) at least one of R and R' is substituted by hydroxy on a primary carbon atom that is not adjacent to any amino nitrogen. R and R' can also form part of a ring compound as a six membered ring. More preferably, R and R' are independently alkyl and desirably up to 7 carbons each and especially for water-base formulations hydroxy (primary) alkyl up to 4 carbons each.

A variety of amines, however, may be suitably employed together as, for example, primary and secondary amines which are mixtures of alkyl amines and hydroxy alkyl amines. The important criterion is that there be sufficient hydroxy functionality, especially primary hydroxy, in the reaction product of the amine reactant and epoxy reactant to insure adequate reaction with the amino resin crosslinking agent.

Preferably, however, about 90 or more mole percent of the amine reactant comprises amino alcohols with primary hydroxy and especially hydroxy alkyl monoamine preferably bearing a primary hydroxy on both alkyl groups.

3. Reaction Conditions for Product of Epoxy Reactant and Amine Reactant

The epoxy and amine reactants are reacted at conditions that allow opening of the epoxy ring by amino nitrogen and provide a gell free reaction product. With secondary amines, this generally results in tertiary amino groups whereas primary amines provide secondary amino groups which may undergo further reaction with an unreacted epoxy of the same or more probably of another molecule epoxy reactant resulting in chain extension.

The reaction medium comprises preferably nonaqueous medium that may be of diverse but preferably polar character and serves to maintain contact of reactants, control reaction speed, maintain desirable viscosity and other functions well known in the art. Thus, suitable solvents and diluents for the reaction medium include aromatic and aliphatic hydrocarbons, halides, ethers, alcohols, ketones such as methylamyl ketone, n-amyl ether, xylene, butanol, oxygenated solvents such as propylene glycol monopropyl ether, cellosolves as 2-methoxy ethanol, 2-butoxy ethanol, carbitols as ethoxy butoxy ethanol, and the like including mixtures of these. Moreover, di- and polyhydroxy compounds, as hereinafter disclosed, may also serve as reaction medium or part thereof.

Elevated reaction temperatures may be employed to facilitate reaction between the epoxy reactant and amine reactant and the reaction may be conducted stepwise. The reaction is complete when the product is substantially free of unreacted epoxy groups as nearly equivalent amounts (e.g. about 0.9–1.0 amine equivalents per 1 to 1.1 epoxy equivalent wherein an amine equivalent is one for a mole of secondary monoamine and two for a mole of primary monoamine and mole of diepoxide compound, for example, has two equivalents) are preferred. Thus, the reaction product of the epoxy reactant and amine reactant shouuld contain less than 20% of the original unreacted epoxy groups, more desirably less than 10% as 5% or less unreacted epoxy groups, based on the number originally present.

(B) AMINO RESIN CROSSLINKING AGENT

The amino resin crosslinking agent may be admixed with the above reaction product (A) at levels of about 5–30 weight percent of the combined weight of (A) and optional ingredient (C) as hereinafter described. Preferred amino resin crosslinking agent includes well known and commercially available materials that are principally condensation products of amino or amido compounds with aldehydes which may be modified by monohydric alcohols of normally up to about four carbons.

Especially preferred amino resin crosslinking agents are partially alkylated melamines (melamine formaldehyde resins modified by alcohols) e.g. partially methylated melamines and butylated melamines. Another preferred cross-linking agent is urea formaldehyde condensate modified by alcohol as butylated urea resin. Mixtures of crosslinkers as mixtures of alkylated melamines and alkylated urea are found especially suitable as, for instance, in solvent base primers using butylated types at weight ratios of (a) butylated melamine resin to (b) butylated urea resin of a:b of between 1:1 to 10:1.

Other suitable crosslinkers that are amino resins include glycol uril resins and benzoguanimine resin.

(C) OPTIONAL INGREDIENTS

Di- and polyhydroxy compounds of diverse character may be employed to modify film properties as well as acting as solvent including reactive solvent for solubilizing the crosslinking compositions. These compounds can also impart increased flexibility as well as reducing cratering in spray primers formulated with (A) and (B) above.

A preferred class of hydroxy compounds include aliphatic di hydroxy compounds, especially glycols and glycol ethers of the formula $HO-C_aH_{2a}O)_x(C_bH_{2b}O)_yH$ wherein a, b, x and y are independent integers and a and b are from 2 to 6 and x and y are from 0-10 with the sum of x and y being from 1 to 10. Examples include ethylene glycol, dipropylene glycol, and 1,6 hexanediol. Another class of glycols include hydroxy terminated polybutadienes, hydrogenated bisphenol-A, such hydroxy compounds being of generally hydrophobic character and molecular weights of about preferably 100–5000, number average. Higher boiling solvents (e.g. boiling point above about 180° C. as 190°–250°) that are of polar character tend to interact with the crosslinking composition and thereby allow higher solids content.

Pigments may be used in the primer compositions of this invention in accordance with usual technique except, if desired, chromate pigments need not be included to get good corrosion resistance. Exemplary pigments include titanium dioxide, silica, carbon black, and barytes and are employed at pigment: binder (i.e. sum of (A) and (B) above) weight ratios of about 40:60–60:40. Other ingredients as solvents, diluents, surfactants, catalysts and the like may also be included for their respective functions.

Catalysts and especially acid catalysts may be used to accelerate cure of the primer compositions herein as by lowering cure temperatures required to effect crosslinking within a 15–30 minute bake cycle from about 180° C. to 140° or even less. Acid catalyst include protic or Lewis acid materials preferably at about 0.5–5.0% by weight of the primer composition and typical acids include strong acids such as phosphoric acid, paratoluene sulfonic acid, and substituted boron compounds as trialkoxy boron compounds, although, however, certain of these materials may result in films which exhibit less than desired moisture resistance.

An especially preferred catalyst for crosslinking compositions herein comprises reactive hydroxy (preferably aliphatic) phosphate esters made by reacting $P_2O_5$ and di or triol. This catalyst, employed preferably between about 0.1–5% by weight of the combined weight of (A) epoxy amine reaction product and (B) amino resin crosslinking agent provides not only reduced cure temperature but also, as distinguished from other usual strong catalysts advantageously does not increase moisture sensitivity in certain formulations, particularly solvent based primers and can also lead to improved corrosion resistance in water base primers as spray primers. The reactive phosphate comprises a hydroxy functional organophosphate which is present in the composition as a mono- or diester or as a mixture of such mono- and diesters. The hydroxy functional organophosphate esters useful in the composition of the invention include those having the formula:

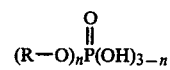

$$(R-O)_nP(OH)_{3-n}$$

wherein n=1 to 2 and R is hydroxy substituted hydrocarbon, preferably selected from the group consisting of mono- or dihydroxy alkyl, cycloalkyl, or aryl radicals. Preferably the alkyl, cycloalkyl, or aryl radicals contain 3 to 10 carbon atoms, and especially desirable are aliphatic or cycloaliphates radicals substituted by hydroxy, optionally interrupted by heteroatoms as oxy as well as aryl.

Among the numerous suitable mono- or dihydroxy functional radicals are: 2-ethyl-3-hydroxyhexyl; 4-methylolcyclohexylmethyl; 2,2 diethyl-3-hydroxypropyl; 8-hydroxyoctyl; 6-hydroxyhexyl; 2,2-dimethyl-3-hydroxy-propyl; 2-ethyl-2-methyl-3-hydroxypropyl; 7-hydroxyheptyl; 5-hydroxypentyl; 4-methylolbenzyl; 3-hydroxyphenyl; 2,3 dihydroxypropyl; 5,6 dihydroxyhexyl; 2-(3-hydroxycyclohexyl)-2-hydroxy ethyl; and 2-(3-hydroxypentyl)-2-hydroxyethyl.

The above radicals are intended to be only exemplary and numerous other radicals falling within the defined scope of the organophosphate esters useful in the compositions of the invention will be apparent to those skilled in the art. Among the most preferred radicals are mono- or dihydroxy functional alkyl radicals containing 3 to 10 carbon atoms.

A preferred method for preparing the hydroxy functional organophosphate esters useful in the compositions of the invention is by an esterification reaction between an excess of an alkyl, cycloalkyl or aryl diol or triol or mixture thereof and phosphorus pentoxide. When a triol is used as a reactant, preferably at least one of the hydroxyl groups should be secondary. The reaction between the diol or triol and the phosphorus pentoxide is generally carried out by adding phosphorus pentoxide portionwise to an excess of diol or triol in a liquid state or in solution in a suitable solvent. A preferred temperature for carrying out the reaction is between about 50° C. and about 60° C. Due to the multiple hydroxy functionality of the diol or triol reactant, minor amounts of polymeric acid phosphate as well as certain cyclophosphates are also generated during the reaction. These polymeric and cyclic materials also serve as a reactive catalyst and, therefore, need not be separated from the hydroxyphosphate esters described above. It is advantageous in preferred embodiments of the invention to employ all reaction products, i.e., the hydroxy functional organophosphate esters and the minor amount of polymeric acid phosphate cyclophosphates, as well as excess diol or triol in the crosslinking compositions. Excess diol or triol may serve in those compositions as all or a portion of the optional hydroxy functional additive. Reactive catalysts prepared by the above preferred method will generally include about a 1 to 1 ratio of the mono- and diester organophosphate.

Still another preferred method of preparing the hydroxy functional organophosphate esters useful in compositions of the invention is by an esterification reaction between phosphoric acid and an alkyl, cycloalkyl or arylmonoepoxide. This reaction is carried out by adding between about 1 and about 2 moles, preferably between about 1 and about 1.5 moles, of the monoepoxy material to 1 mole of phosphoric acid or its solution in a suitable solvent. During the esterification reaction which occurs, a hydroxyl group is formed. If a dihydroxy radical is desired in the organophosphate ester, a monoepoxide bearing hydroxy functionality may be used as a reactant. Preferred monoepoxide materials useful in this method are well known monoepoxides selected from monoepoxy ethers, monoepoxy esters and alkylene oxides. Exemplary of preferred monoepoxides for use in this esterification reaction are: propylene oxide, butylene oxide, cyclohexene oxide, styrene oxide, n-butylglycidyl ether and ethylglycidyl ether. As will be understood by these skilled in the art, the proportion of monoester and diester formed by the reaction will vary with the selected molar ratio of the monoepoxide and the phosphoric acid. When 1 mole of monoepoxide is used, per mole of phosphoric acid primarily monoester is formed while a molar ratio of 2 to 1 results in primarily diester. A molar ratio of 1.5 to 1 will result in an approximately 1 to 1 mixture of mono- and diesters. In all cases a minor amount of the triester will be formed. While this triester obviously will not serve as a reactive catalyst, it will crosslink with the amino crosslinking agent of the composition and, thus, may be safely included.

The hydroxy functional organophosphate ester component of the crosslinking composition of the invention is a reactive catalyst which allows the composition to cure rapidly at a low temperature. The acid functionality of the mono- or diester or mixture of such esters reacts with the hydroxy reactive functionality e.g., amino resin crosslinking agent so as to include the reactive phosphate in the crosslinked network thereby not deleteriously effecting moisture resistance and, in some cases, improving corrosion resistance.

Primer Formulation

The crosslinking compositions comprising epoxy reactant and amine reactant reaction product, amino resin crosslinking agent and optionally di or polyhydroxy compound may be formulated into a variety of primer formulations including those based on non-aqueous medium and water base medium. Such primers may be used as coatings for bare and treated steels (conversion coated with phosphates) as well as guide coats over previously deposited primers applied as by electrodeposition. Conventional modifying ingredients may be used in the primer formulations including, for example, flow control agents, pigment dispersants, thixotropes, anti-cratering aids, photostabilizers and the like.

1. Solvent Base Primers

Solvent base primers exhibit good thermal and shelf stability and may be applied to metal substrates according to usual techniques as by spray, curtain, dip and other such coating methods.

2. Water Base Primers

Water base primers may be formulated from the crosslinking compositions as hereinbefore and hereinafter described. These water-based primers are made with at least partially neutralized epoxy amine reaction products. The amino resin crosslinking agent is selected from water soluble and dispersible agents as also described and employed at similar levels. The water-based primers may be applied as spray primers and also can be electrodeposited. (See commonly assigned U.S. Ser. No. 938,673, filed Aug. 31, 1978 in name of Robert Wingfield, now U.S. Patent for 192,929.

Water-based spray primers are advantageously prepared in water compatible solvents and diluents as ethylene glycols and alkylated glycols, e.g. oxygenated solvents as cellosolves and carbitols and thereafter at least partially neutralized by acid, particularly weak organic acid as formic, acetic or butryric acid. Coupling agents may be advantageously employed.

Water-based spray primers can be formulated with high levels of water e.g., greater than 10% as about 30–50% by weight and yet cure within conventional conditions as 180° C. for 20–30 minutes and even less with certain catalyst as reactive hydroxy phosphate catalyst as herebefore and hereinafter described.

It is found that particularly advantageous waterbase spray primers may be formulated as stable emulsions when epoxy and amine reactants are reacted in water miscible solvent and the amine reactant comprises one or more water soluble amino alcohol up about 20 carbons, especially water soluble hydroxy alkyl amines, particularly secondary amines containing at least two primary hydroxy groups as diethanol amine and di-propanolamine.

Especially suitable water miscible solvents (water miscible as used herein means the solvent forms at 25° C. a continuous phase with water when at 20% by weight of water or more) include as examples monohydroxy ethers as $C_1$-$C_6$ etherified glycols as $R(OCx)_yOH$ wherein R is alkyl from 1-8 carbons and x is 2-4 and y is 1-10 and particularly those which have boiling points below about 180° C., e.g., 2-methoxy ethanol, 2-ethoxy ethanol, and propylene glycol monopropyl ether. Other suitable solvents include ethanol, propanol, isopropanol and the like. Higher boiling e.g. above about 180° C. glycols may also be used as co-reactive solvents.

In a convenient method of making, a concentrate is made from reacting epoxy reactant and amine reactant in water miscible solvent and thereafter at least partially neutralizing with weak organic acid of up to 4 carbons as formic, acetic or oxalic acid in the presence of amino resin cross-linking agent to form a concentrate that may be thereafter readily dispersed in water for spraying.

Moreover, partially methylated or butylated melamine resins are preferred. Conventional pigment dispersants and other additives including silanes and organotitanates may also be employed.

3. Alternative Embodiment—Multicomponent Coating Composition

The epoxy and amine reactants along with the amino resin crosslinking agent and, preferably, di or polyhydroxy compound, all as above described, may alternatively be reacted together on the substrate to be coated. Thus, in this embodiment the epoxy and amine reactants and desirably di or polyhydroxy compound (preferably having boiling points in excess of about 200° C.) are intimately admixed and applied to the substrate to be coated and cured thereon. In this embodiment, however, the amino reactant can also comprise solely primary amine that is a hydroxy amine. The primary amine, however, is normally employed with di-epoxides.

Preferred primary amine, for this embodiment, that contain primary hydroxy are hydroxy lower alkyl amines as ethanol amine, propanolamine, pentanol amine and the like. If secondary amines that are hydroxy amines are employed, then such amines are preferably also lower hydroxy aliphatic amines as dialkanol amines containing up to 7 carbon atoms, e.g. diethanolamine or as lower alkyl hydroxy alkyl amines as 2-(methylamino)-ethanol.

In this embodiment, it is important for corrosion resistance properties that primer formulations are admixed shortly, e.g. within less than a few hours of but desirably greater than one half hour before application and cure. Advantageously, uncatalyzed multicomponent crosslinking compositions may be cured within conventional curing schedules and, if desired, be accelerated by catalyst. On the other hand, it is important that the amino resin crosslinking agent and epoxy reactant not be permitted to stand for an undue length of time (e.g. several weeks) prior to formulation with the amine reactant comprising primary amine and application to the substrate. Preferably, the multicomponent system is applied to substrates between about 30-600 minutes after mixing.

As mentioned, this alternative multicomponent embodiment preferably also utilizes di- or polyhydroxy compound such that, for example, the di- or polyhydroxy compound advantageously serves as reactive solvent which allows crosslinking compositions and ultimate coating compositions as primers which have high solids content. Moreover, film properties as flexibility may be enhanced through incorporation of the di- or polyhydroxy compound. In this regard, glycols of the formula $HO-(C_aH_{2a}O)_x(C_bH_{2b}O)-_yH$ wherein a and b are independently 2-6 and x and y are independently 2-10 wherein the sum of x and y is 2-10 are preferably employed.

The alternative multicomponent coating composition advantageously may be formulated into solvent base primer which may be applied in a variety of ways to the substrate as, for example, through dip, spray, curtain and like coatings.

The following examples are intended as illustrating some of the more preferred aspects and, accordingly, should not be considered as necessarily limiting the scope of invention. All degrees are in degrees Celsius and parts in parts by weight unless specified otherwise.

EXAMPLE I

A heat curable coating composition suitable for automotive application is prepared from a bis-phenol A-epichlorohydrin epoxy resin, alkanolamine, and an amino resin crosslinking agent in the manner hereinafter set forth:

| Part A Preparation of epoxy-alkonalamine resin | |
|---|---|
| Materials | Parts by Weight |
| Epon 1004[1] | 625 |
| Diethanolamine | 70 |
| Methyl amyl ketone | 625 |
| Butanol | 200 |
| Reactor Charge | |
| Diethanolamine | 70 |
| Methyl amyl ketone | 625 |

[1] A product of Shell Chemical Company, which is a reaction product of epichlorohydrin and bis phenol-A and described such as being a solid with melting point 95-105° C.; Gardner-Holdt viscosity at 25° C. of Q-U(40% w soln in butyl Dioxitol ®)Epoxide Equivalent 875-1000 (grams resin per gram-equivalent of epoxide; Equivalent Weight (grams resin to esterify one mole acid) 175. (Data Sheet SC:69-58).

The reactor charge is heated to 70°-80° C. in a reaction vessel equipped with a stirrer, reflux condenser, and thermometer. The Epon 1004 is added over a four hour period. The temperature is maintained at 70°-80° C. throughout the addition of the epoxy resin and for four hours thereafter. The epoxy-alkanolamine resin so formed is then cooled to 50° C. and diluted with butanol. The resin is then cooled to room temperature, filtered and formulated into a primer as hereinafter described.

| Part B Formulation of Primer | |
|---|---|
| Materials | Parts by Weight |
| Butylated melamine resin (RN 602)[2] | 46 |

-continued

| Part B Formulation of Primer | |
|---|---|
| Materials | Parts by Weight |
| Urea resin (RN 512)[3] | 6.7 |
| Titanium dioxide pigment | 15 |
| Carbon black pigment | 15 |
| Silica pigment | 11 |
| Barytes pigment | 102 |
| Xylene | 50 |
| Epoxy-alkanolamine resin from part A | 399 |

[2] Product of Mobil Chemical Company that is described as being butylated melamine formaldehyde resin with viscosity of V-X; 58% non-volatiles; Acid number 2 maximum; solvent n-butanol.
[3] Product of Mobil Chemical Company that is described as being butylated urea formaldehyde resin; viscosity W-Y; non-volatiles 50% ± 2%; Acid number 3.5–4.5; Color Gardner/max.; Solvent 80% n-butanol and 20% ethyl-benzene.

An unpigmented primer is prepared by dissolving the epoxyalkanolamine resin, the butylated melamine and the urea resin in xylene and butanol. A mill base is then prepared using one-third of the unpigmented resin and the pigments shown above. The remaining unpigmented primer is then added and thoroughly dispersed with the mill base. The resulting fully formulated primer is filtered, applied to cold rolled, unphosphated steel panels by spraying and cured at 180° C. for 20 minutes. The cured coating displays excellent corrosion resistance in salt spray, good solvent resistance to xylene and good flexibility and hardness.

EXAMPLE II

The procedures of Example I are repeated with the following difference: Epon 1001(1) replaces Epon 1004. All other materials used in preparing the epoxy-alkanolamine resin and the fully formulated primer are the same in kind and quantity as in Example I.

| Materials | Parts by Weight |
|---|---|
| Epon 1001[1] | 334 |

[1] Product of Shell Chemical Company which is described as a solid and having viscosity (Gardner Holdt) D-G, 1.0–1.7 poises (ASTMD-445) in 40% w soln. butyl Dioxitol®; and Epoxide equivalent 450–550.

Unphosphated steel panels coated with the fully formulated primer display excellent corrosion resistance to salt spray, good xylene solvent resistance, flexibility and hardness.

EXAMPLE III

The procedures of Example I are repeated with the following difference: Epon 828 replaces Epon 1004. All other materials used in preparing the epoxy-alkanolamine resin and the fully formulated primer are the same in kind and quantity as in Example I.

| Materials | Parts by Weight |
|---|---|
| Epon 828[1] | 126 |

[1] Product of Shell Chemical Company which is described as a liquid and having a viscosity (ASTM D-445) 110–150; Epoxide equivalent 185–192; Gardner Color 3 max; lbs./gal. (68° C.) 9.7.

Unphosphated steel panels coated with the fully formulated primer display excellent corrosion resistance to salt spray, good xylene solvent resistance, flexibility and hardness. Some sensitivity to condensing humidity is also observed.

EXAMPLE IV

The procedures of Example I are repeated with the following difference: Diethanolamine is replaced by 2-(methylamino) ethanol. All other materials used in preparing the epoxy-alkanolamine resin and the fully formulated primer are the same in kind and quantity as in Example I.

| Materials | Parts by Weight |
|---|---|
| 2-(methylamino) ethanol | 49 |

Unphosphated steel panels coated with the full formulated primer display excellent corrosion resistance to salt spray, good xylene solvent resistance, flexibility and hardness.

EXAMPLE V

A heat curable coating composition suitable for automotive application is prepared from an epoxy-alkanolamine resin, and an amino resin crosslinking agent. The epoxy-alkanolamine resin in this case is the condensation product between lower molecular weight bis phenol A epichlorohydrin epoxy resins and mixtures of primary and secondary alkanoalamines. Resin preparation and primer formulation proceeds in the manner hereinafter set forth:

| Part A Preparation of epoxy-alkanolamine resin | |
|---|---|
| Materials | Parts by Weight |
| Epon 828[1] | 190 |
| Diethanolamine | 52 |
| Ethanolamine | 15 |
| Methyl amyl ketone | 200 |
| Butanol | 75 |
| Reactor Charge | |
| Diethanolamine | 52 |
| Ethanolamine | 5 |
| Methyl amyl ketone | 200 |

[1] A product of Shell Chemical Company, see Example III.

The reactor charge is heated to 70°–80° C. in a reaction vessel equipped with a stirrer, reflux condenser and thermometer. The Epon 828 is added over a one hour period. The temperature is maintained at 70°–80° C. throughout the addition of the epoxy resin and for one hour thereafter. The remaining portion of ethanol amine is then added and the reaction is maintained at 70°–80° C. for an additional one hour. The epoxy-alkanolamine resin so formed is cooled to 50° C. and then diluted with butanol. The resin is cooled to room temperature, filtered and formulated into a primer as hereinafter described.

| Part B Formulation of Primer | |
|---|---|
| Materials | Parts by Weight |
| Epoxy-alkanolamine resin from part A | 532 |
| Butylated melamine resin (RN602)[2] | 69 |
| Urea resin (RN512)[3] | 10 |
| Titanium dioxide pigment | 23 |
| Carbon black pigment | 23 |
| Silica | 16 |
| Barytes | 153 |
| Xylene | 75 |

| Part B Formulation of Primer | |
|---|---|
| Materials | Parts by Weight |
| Butanol | 113 |

(2),(3)Products of Mobil Chemical Company, see Example I.

The procedure for the pigmentation of the primer is the identical to the one employed in Example IB.

EXAMPLE VI

A heat curable coating composition suitable for automotive application is prepared from a bis phenol A-epichlorohydrin epoxy resin, an alkanolamine, an amino resin crosslinking agent and glycol in the manner hereinafter set forth:

| Primer Formulation | |
|---|---|
| Materials | Parts by Weight |
| Epoxy-alkanolamine resin from Example Ia | 399 |
| Butylated melamine resin (RN602)(1) | 80 |
| Urea resin (RN512)(2) | 10 |
| Triethylene glycol | 40 |
| Methyl amyl ketone | 100 |
| Butanol | 100 |
| Titanium dioxide pigment | 15 |
| Carbon black pigment | 15 |
| Silica pigment | 11 |
| Barytes pigment | 102 |

(1)See Example I, product of Mobil Chemical Company.
(2)See Example I, product of Mobil Chemical Company.

The unpigmented primer is prepared by dissolving the epoxyalkanolamine resin, the butylated melamine resin, the urea resin and the triethylene glycol in xylene and butanol. The primer is pigmented in the manner described in Example Ib. The fully formulated primer is filtered, applied to cold rolled, unphosphated steel panels and cured at 180° C. for 20 minutes. The coating displays satisfactory corrosion resistance in salt spray.

EXAMPLE VII

The procedures of Example VI are repeated with the following difference: hydrogenated bis phenol A is substituted for the triethylene glycol. All other materials in preparing the fully formulated primer are the same in kind and quantity as in Example VI.

| Materials | Parts by Weight |
|---|---|
| Hydrogenated bis-phenol A | 20 |

Unphosphated steel panels coated with the fully formulated primer display excellent corrosion resistance, flexibility and hardness.

EXAMPLE VIII

The procedures of Example VI are repeated with the following difference: Poly bd R-45HT, a hydroxy terminated poly butadiene resin, is substituted for the triethylene glycol. All other materials used in preparing the fully formulated primer are the same in kind and quantity as in Example VI.

| Materials | Parts by Weight |
|---|---|
| Poly bd R-45HT(1) | 20 |

(1)a product of ARCO/Chemical company, division of Atlantic Richfield Company.

Unphosphated steel panels coated with the fully formulated primer display excellent corrosion resistance, flexibility and hardness.

EXAMPLE IX (a) Heat curable coating compositions suitable for automotive application are prepared in the manner discussed in Examples I–VIII with the exception that from 2.5% by weight of phosphoric acid is added to the primer. The inclusion of small amounts of acid catalyst lowers the cure temperature.

(b) A heat curable coating composition suitable for automotive application is prepared from a bis-phenol-A-epichlorohydrin epoxy resin, alkanolamine, and an amino resin crosslinking agent in the manner hereinafter set forth:

| Part A Preparation of Epoxy-alkanolamine Resin | |
|---|---|
| Materials | Parts by Weight |
| Epon 1004(1) | 625 |
| Diethanolamine | 70 |
| Methylamyl ketone | 625 |
| Butanol | 200 |
| Reactor Charge | |
| Diethanolamine | 70 |
| Methyl amyl ketone | 625 |

(1)Product of Shell Chemical Company, see Example I.

The reactor charge is heated to 70°–80° C. in a reaction vessel equipped with a stirrer, reflux condenser, and thermometer. The Epon 1004 is added over a four hour period. The temperature is maintained at 70°–80° C. throughout the addition of the epoxy resin and for four hours thereafter. The epoxy-alkanolamine resin so formed is then cooled to 50° C. and diluted with butanol. The resin is then cooled to room temperature, filtered and formulated into a primer as hereinafter described.

| Part B Formulation of Primer | |
|---|---|
| Materials | Parts by Weight |
| Epoxy-alkanolamine resin from part A | 39.9 |
| Butylated melamine resin (RN602)(2) | 4.6 |
| Urea resin (RN512)(3) | 0.67 |
| Titanium dioxide pigment | 15 |
| C-Black pigment | 15 |
| Silica pigment | 11 |
| Barytes pigment | 102 |
| Xylene | 50 |
| Butanol | 75 |
| Reaction product of 2-ethyl-1,3-hexandiol with $P_2O_5$ (1% based on resin solids)(4) | 0.23 |

(2),(3)Products of Mobil Chemical Company, see Example I.
(4)Prepared as follows:
In a three-necked round bottom flask equipped with a stirrer dropping funnel and a thermometer are placed 2500 grams of dry (dried over molecular sieves) 2-ethyl-1,3-hexandiol. Phosphorus pentoxide (450 grams) is added portionwise with continuous stirring and an exothermic reaction occurs. The addition of phosphorus pentoxide is regulated to maintain the temperature at 50° C. After the addition is complete, the reaction mixture is stirred at 50° C. for one more hour and then filtered. The acid equivalent weight by titration with medium hydroxide solution is found to be 357.

An unpigmented primer is prepared by dissolving the epoxy-alkanolamine resin, the butylated melamine, the urea resin, and the reaction product of 2-ethyl-1,3-hexanediol with $P_2O_5$, in the butanol and xylene. A mill base is then prepared using one-third of the unpigmented primer and the pigments shown above. The remaining clear primer is then added and thoroughly dispersed with the mill base. The resulting fully formulated primer is filtered, applied to cold rolled, unphosphated steel panels by spraying and cured at 140° C. for 20 min. The cured coating displays excellent corrosion resistance in salt spray, good xylene solvent resistance, flexibility and hardness.

EXAMPLE X

This example illustrates the epoxy resins containing ester functionality should be avoided in preparing epoxy alkanolamine resins. In this example poor corrosion resistance of a primer coating is observed when Araldite Cy 179 is incorporated into the formulation.

| Part A<br>Preparation of epoxy-alkanolamine resin | |
|---|---|
| Materials | Parts by Weight |
| Araldite Cy179[1] | 126 |
| Diethanolamine | 105 |
| Butanol | 130 |
| Reactor Charge | |
| Diethanolamine | 105 |
| Butanol | 100 |

[1]A product of Ciba-Geigy Corp., an ester-linked diepoxide.

The reactor charge is heated to 70°-80° in a reaction vessel equipped with a stirrer, reflux condenser and thermometer. A solution of the Araldite Cy179 in 30 parts of butanol is added dropwise. The temperature is maintained at 70°-80° C. during the addition and for 20 hours thereafter. The resin is then cooled and formulated into a primer as hereinafter described.

| Primer Formulation | |
|---|---|
| Materials | Parts by Weight |
| Epoxy-alkanolamine resin from X, Part A | 67 |
| Butylated melamine resin (RN602)[2] | 39 |
| Triethylene glycol | 19 |
| Ferric oxide pigment | 4 |
| Titanium dioxide pigment | 4 |
| Silica | 3 |
| Barytes | 29 |
| Butyl Acetate | 15 |
| Xylene | 15 |

[2]See Example I, a product of Mobil Chemical Company.

The unpigmented primer is prepared by dissolving the epoxyalkanolamine resin, the butylated melamine and the triethylene glycol in butyl acetate and xylene. The primer is pigmented in the manner described in Example Ia. The fully formulated primer is filtered, applied to cold rolled, unphosphated steel and cured at 180° C. for 20 minutes. Coatings obtained from this primer display very poor corrosion resistance.

Table of Results

Set forth below in the Table are results obtained relative to certain of the above Examples. The tests conducted are standard laboratory tests that are intended to determine properties of primer coatings. The test procedures are as follows: 24 hour salt spray test ASTMB 117-62, 64 Salt Spray Test; 10 day salt spray ASTMB 117-62, 64 Salt Spray Test for 240 hours; condensing humidity test combined ASTMD 2246 and 2247 combined humidity testing under continuous condensing humidity; cathodic alkaline resistance test as described by A. G. Smith and R. A. Dickie, Ind. Eng. Chem., Prod. Res. Dev., 17(1), 45 (1978), a test in which the resistance of the coating to displacement/degradation by cathodically produced hydroxide is evaluated.

| Test | Epoxy Ester Primer [1] | Ex. I | Ex. II | Ex. III | Ex. IV | Ex. VII | Ex. X |
|---|---|---|---|---|---|---|---|
| A | 3[2] | 10 | 10 | 10 | 7[2] | 10 | 0[2] |
| B | — | 9 | 8 | NA[3] | — | 9 | — |
| C | 10 | 9 | 7 | 2 | NA[3] | 8 | 9 |
| D | 3 | 10 | 10 | 10 | 9 | 10 | 0 |

A is 24 Hour Salt Spray Test.
B is 10 Day Salt Spray Test.
C is Condensing Humidity (10 day exposure).
D is Cathodic Alkaline Resistance (8 hour exposure).
0–2 - Total delamination or swelling of coating
3–5 - Significant loss from the scribe line, or serious blushing or blistering of coating
6–8 - Little or no adhesion loss from the scribe line, but some minor amount of non-scribe failure; also slight blushing
9–10 - No or very slight adhesion loss
[1]Tall oil modified, epon 828 epoxy ester primer which has been crosslinked with a melamine formaldehyde resin.
[2]Test discontinued at this point.
[3]Not available.

EXAMPLE XI

A multicomponent, heat curable coating composition suitable for automotive application is prepared from a bis phenol A-epichlorohydrin epoxy resin, alkanolamine, a glycol, and an amino resin crosslinking agent in the manner hereinafter set forth:

| Part A<br>Preparation of Unpigmented Primer Formulation | |
|---|---|
| Materials | Parts by Weight |
| Epon 828[1] | 34 |
| Ethanolamine | 12.2 |
| Triethylene Glycol | 19.4 |
| Butylated melamine resin[2] | 39 |
| Xylene | 30 |

[1]See Example III, a product of Shell Chemical Company
[2]See Example I, a product of Mobil Chemical Company An unpigmented primer is prepared by dissolving the epoxy resin, the ethanolamine, the triethylene glycol and the butylated melamine resin is xylene. The mixture is thoroughly stirred for 45 min. during which time a slight temperature increase is observed. The primer is then applied to cold rollod, unphosphated steel panels by spraying and cured at 180° C. for 20 minutes. The cured coating displays excellent corrosion resistance in salt spray, good solvent resistance to xylene and good flexibility and hardness.

| Part B<br>Preparation of Fully Formulated Primer | |
|---|---|
| Materials | Parts by Weight |
| Unpigmented primer formulation from Part A | 134.6 |
| Titanium Dioxide pigment | 4.1 |
| Ferric Oxide pigment | 4.1 |
| Silica pigment | 2.7 |
| Barytes pigment | 28.6 |

The freshly prepared unpigmented primer solution from part A is immediately combined with the titanium dioxide, the ferric oxide, the silica, the barytes. The pigment is dispersed; the fully formulated primer is then filtered, and immediately applied to cold rolled, unphosphated steel panels by spraying. After curing at 180° C. for 20 minutes, the coating displays excellent corrosion resistance in salt spray and good solvent resistance.

EXAMPLE XII

The procedures of Example XI are repeated with the following difference: 2-(methyl amino)-ethanol replaces the ethanolamine. All other materials used in preparing the unpigmented primer and the fully formulated primer are the same in kind and quantity as in Example XI.

| Materials | Parts by Weight |
|---|---|
| 2-(methyl amino)-ethanol | 15 |

Unphosphated steel panels coated with the fully formulated primer display excellent corrosion resistance good xylene solvent resistance and flexibility.

EXAMPLE XIII

The procedures of Example XI are repeated with the following difference: 3-amino propanol replaces the ethanol amine. All other materials used in preparing the unpigmented primer and the fully formulated primer are the same in kind and quantity as in Example XI.

| Materials | Parts by Weight |
|---|---|
| 3-amino propanol | 7.5 |

Unphosphated steel panels coated with the fully formulated primer display excellent corrosion resistance good xylene solvent resistance and flexibility.

EXAMPLE XIV

The procedures of Example XI are repeated with the following difference: Epon 1001 replaces Epon 828. All other materials used in preparing the unpigmented primer and the fully formulated primer are the same in kind and quantity as in Example XI.

| Materials | Parts by Weight |
|---|---|
| Epon 1001[1] | 50 |

[1]See Example II, a product of Shell Chemical Company.

Unphosphated steel panels coated with the fully formulated primer display excellent corrosion resistance, good xylene solvent resistance and flexibility.

EXAMPLE XV

This example illustrates that high levels of alkanol amines are required for good coating properties for the multicomponent system. In this example poor corrosion resistance of a primer coating is observed when too high a level of a secondary alkyl amine is incorporated into the primer formulation.

| Part A Preparation of Unpigmented Primer | |
|---|---|
| Materials | Parts by Weight |
| Epon 828[1] | 34 |
| Triethylene Glycol | 19.4 |
| Ethanolamine | 6.1 |
| Diethylamine | 7.3 |
| Butylated Melamine resin (RN602)[2] | 39 |
| Xylene | 30 |

[1]See Example III, a product of Shell Chemical Company.
[2]See Example I, a product of Mobil Chemical Company.

The unpigmented primer is prepared by combining the epoxy resin, the triethylene glycol, the ethanolamine, the diethylamine and butylated melamine in xylene. Once homogeneous, the material in part A above is pigmented in the manner described in Example XIB. The fully formulated primer is applied to cold rolled, unphosphated steel panels and baked at 180° C. for 20 minutes. The coating which resulted was not satisfactorily cured.

EXAMPLE XVI

This example illustrates that primers with poor corrosion resistance are obtained if the epoxy resin is reacted with only primary alkanolamine and glycol prior to formulation of the primer.

| Materials | Parts by Weight |
|---|---|
| Epon 828[1] | 34 |
| Triethylene glycol | 19.4 |
| Ethanolamine | 12.2 |
| Butylated melamine resin (RN602)[2] | 39 |
| Xylene | 30 |
| Methyl ethyl ketone | 25 |
| Butanol | 40 |
| Reactor Charge | |
| Epon 828[1] | 34 |
| Triethylene glycol | 19.4 |
| Ethanol amine | 12.2 |
| Methyl ethyl ketone | 12 |

[1]See Example III, a product of Shell Chemical Company.
[2]See Example I, a product of Mobil Chemical Company.

The reactor charge is stirred in a reaction vessel equipped with a stirrer, reflux condenser and thermometer. The solution is initially clear and of low viscosity. Within 5–10 minutes of stirring, and exothermic reaction begins, and after 1½ hours the temperature rises spontaneously to 60° C. After cooling to room temperature the reactor charge consists of a very viscous material which is subsequently diluted with butanol and xylene. The butylated melamine is added and the material is pigmented in the manner described in Example XIB. The fully formulated primer is applied to steel panels and cured in the manner previously described. The resulting coating has very poor corrosion resistance.

EXAMPLE XVII

This example illustrates that the multicomponent primer should be aged for a certain period of time prior to application to metal panels. This example describes a variation of Example XI which affords coatings with poor corrosion resistance.

| Part A<br>Preparation of Pigmented Component | |
|---|---|
| Materials | Parts by Weight |
| Epon 828[1] | 34 |
| Triethylene Glycol | 19.4 |
| Butylated melamine resin[2] | 39 |
| Pigments from Example IB | 39.5 |
| Xylene | 10 |

[1]See Example III, a product of Shell Chemical Company.
[2]See Example I, a product of Mobil Chemical Company.

A pigmented component is prepared by thoroughly dispersing the pigments in the epoxy resin, triethylene glycol and the melamine. This pigmented component is stable for three months at room temperature.

| Part B<br>Two Component Primer System | |
|---|---|
| Materials | Parts by Weight |
| Pigmented Component from Part A | 141.9 |
| Ethanolamine | 12.2 |

A sprayable primer is obtained by thoroughly mixing the pigmented component from part A with the ethanolamine. The resulting primer is sprayed within 10 minutes and cured at 180° for 20 minutes. The resulting coating has poor corrosion resistance.

EXAMPLE XVIII

The procedures of Example XXVII are followed except that after addition of the ethanol amine the primer formulation is vigorously stirred for 45 minutes and then applied by spraying and cured at 180° C. for 20 minutes. The coating exhibits good corrosion resistance.

EXAMPLE XIX

The procedures of Example XI are followed except that hydrogenated bis-phenol A is used in place of the triethylene glycol and satisfactory primer compositions are obtained.

EXAMPLE XX

The procedures of Example XI and XII are followed except that the following amino resin crosslinking agent is employed in place of the butylated melamine to form two other primer compositions: a glycol uril resin that is Cymel 1170 (a product of American Cyanamide). In each case a satisfactory primer composition is obtained upon inclusion of an equivalent amount of the identified amino crosslinking agent.

EXAMPLE XXI

A heat curable water-based coating composition suitable for automotive application is prepared from epoxy-amine reaction product and amino resin crosslinking agent in the manner as hereinafter set forth:

| Part A<br>Preparation of epoxy alkanol amine reaction product | |
|---|---|
| Materials | Parts by Weight |
| Epon 1004[1] | 405.27 |
| Diethanol amine | 45.41 |
| Propasol P[2] | 299.31 |

[1]See Example I, a product of Shell Chemical Company.
[2]A product of Union Carbide Corporation - propylene glycol monopropylether.

The reactor charge is heated to 80°–85° C. in a reaction vessel equipped with a stirrer, reflux condenser and thermometer. The Epon 1004 is added over a 2 hour period. The temperature is maintained at 80°–85° C. throughout the addition and for 16 hours thereafter. The epoxy alkanol amine reaction product so formed is then cooled to room temperature and formulated into a water-based primer as hereinafter described:

| Part B<br>Preparation of Millbase | |
|---|---|
| Materials | Parts by Weight |
| Epoxy alkanol amine reaction product from Part A | 160.00 |
| Propasol P | 41.04 |
| Barytes pigment | 115.64 |
| Titanium dioxide pigment | 15.84 |
| Iron oxide | 15.84 |
| Silica | 11.08 |

To 160 parts of the epoxy alkanol amine reaction product, 41.04 parts of Propasol P is added and then shaken for 30 minutes. A homogeneous solution is obtained. To this then the pigments as shown above are added and then shaken for 6 hours. A Hegmann gauge reading of 6 to 7 is obtained. This is then used for preparation of fully formulated pigmented primer.

| Fully Formulated Water-Based Primer | |
|---|---|
| Materials | Parts by Weight |
| Millbase from Part B | 79.6 |
| Butylated melamine resin (RN602)[1] | 2.4 |
| Acetic acid | 1.04 |
| KR-55[2] | 0.40 |
| Water (distilled) | 69.30 |

[1]See Example I, a product of Mobil Chemical Company.
[2]Ken-React TTMDTP-55 titanate coupling agent that is said to be tetra (2,2-diallyloxymethyl-1-butoxy) titanium di (di-tridecyl) phosphite, a product of Kenrich Petrochemicals, N.J.

The mill base is weighed into a stainless steel container. To this millbase the melamine resin is added and stirred well using a disperator. Then the KR-55 coupling agent is added and mixed well. The acetic acid is weighed into 10 parts of water in a glass container and then added to the millbase, melamine resin and KR-55 mixture under stirring. The balance of water is then added in 10-15 minutes under vigorous stirring. The whole mixing is accomplished in 15-20 minutes. The resulting fully formulated primer is filtered, applied to cold rolled, unphosphated steel panels by spraying and cured at 180° C. for 20 minutes. The cured coating displays excellent corrosion resistance in salt spray, good solvent resistance to xylene and good flexibility and hardness.

EXAMPLE XXII

The procedures of Example XXI are repeated except for the following difference: The KR-55 coupling agent is replaced by coupling agent KR-238S[1] at an equal weight level with all other materials being the same in kind and quantity.

(1) di (dioctyl pyrophosphate) ethylene titanate, a product of Kenrich Petrochemicals, N.J.

Unphosphated sheet panels coated with the pigmented primer of this example display excellent corrosion resistance to salt spray, good xylene solvent resistance, flexibility and hardness.

EXAMPLE XXIII

The procedures of Example XXI are repeated except for the following difference: The titanate coupling agent KR-55 is replaced by the hydroxy phosphate of Example IX (b) and the level of melamine resin is increased to 4.8 parts by weight. All ether materials are the same in kind and quantity in Example XXI.

Unphosphated steel panels coated with the fully pigmented primer display excellent corrosion resistance, good xylene resistance, flexibility and hardness.

EXAMPLE XXIV

The procedures for Example XXI are repeated with the following differences: The millbase is prepared with 30.5 parts of Propasol P instead of 41.04 parts and the fully pigmented primer contained higher level of water. The ingredients remain the same in kind.

| Part B Preparation of Millbase | |
|---|---|
| Materials | Parts by Weight |
| Epoxy - alkanol amine reaction product from Part A, Example XXI | 160.00 |
| Propasol P[1] | 30.50 |
| Barytes | 115.64 |
| Titanium dioxide | 15.84 |
| Iron oxide | 15.84 |
| Silica | 11.08 |

[1] See Example XXI, a product of Union Carbide Corporation.

It is mixed as in Part B, Example XXI.

| Fully Formulated Primer | |
|---|---|
| Materials | Parts by Weight |
| Millbase from Part B | 87.2 |
| Melamine resin (RN602)[2] | 2.4 |
| Acetic acid | 1.39 |
| KR-55[3] | 0.40 |
| Water | 94.40 |

[2] See Example I, a product of Mobil Oil Chemical Company.
[3] See Exmaple XXI, Titanate coupling agent.

Unphosphated steel panels coated with the fully pigmented primer display excellent corrosion resistance to salt spray, good xylene solvent resistance, flexibility and hardness.

EXAMPLE XXV

The procedures for Example XXIV are repeated with the following difference: Titanate coupling agent is replaced by titanate coupling agent KR-238S (Ken-React a product of Kenrich Petrochemicals and is said to be di(dioctylpyrophosphato) ethylenetitanate). All other materials used in preparing the epoxy alkanol amine resin and the fully formulated primer are same in kind and quantity as in Example XXIV.

| Materials | Parts by Weight |
|---|---|
| KR-238S[1] | 0.4 |

Unphosphated steel panels combed with the fully pigmented primer display excellent corrosion resistance to salt spray, good xylene solvent resistance, flexibility and hardness.

EXAMPLE XXVI

The procedures of Example XXIV are repeated with the following difference: Titanate coupling agent KR-55 is replaced by hydroxy phosphate and the level of the melamine resin is increased. All other materials used in preparing the epoxy-alkanol amine resin and the fully formulated primer are the same in kind and quantity as in Example XXI.

| Materials | Parts by Weight |
|---|---|
| Hydroxy phosphate[1] | 0.24 |
| Butylated melamine resin (RN602) | 4.80 |

[1] Made in accordance with Example IX(b).
[2] A product of Mobil Chemical Company, see Example I.

Unphosphated steel panels coated with the fully pigmented primer display excellent corrosion resistance to salt spray, good xylene solvent resistance, flexibility and hardness.

EXAMPLE XXVII (a) A heat curable water based coating composition suitable for automotive application is prepared from a bis-phenol A epichlorohydrin epoxy resin, alkanol amine and an amino resin crosslinking agent in the manner hereinafter set forth:

| Part A Preparation of epoxy alkanol amine resin | |
|---|---|
| Materials | Parts by Weight |
| Epon 1004[1] | 312.34 |
| Diethanolamine | 35.00 |
| Propasol P[2] | 230.68 |

[1] See Example I, a product of Shell Chemical Company.
[2] See Example XXI, a product of Union Carbide Corporation.

To the mixture of diethanol amine and Propasol P in a 3-necked flask equipped with reflux condenser and thermometer, Epon 1004 was added in small portions over a period of 2 hours at a reflux temperature of 95°–100° C. It was then refluxed for another 18 hours at that temperature.

| Part B Formulation of Primer | |
|---|---|
| Materials | Parts by Weight |
| Epoxy-alkanol amine resin from Part A | 40.00 |
| Melamine resin (RN602) | 4.80 |
| Propasol P | 16.30 |
| Titanium dioxide pigment | 4.40 |
| Iron oxide pigment | 4.40 |
| Silica pigment | 3.08 |
| Barytes pigment | 32.40 |
| Glacial acetic acid | 1.04 |
| Distilled water | 73.94 |

Preparation of the Millbase

To one-third (13.3 parts) or the epoxy alkanol amine resin is added, one-third (1.60 parts) of the melamine resin followed by all of (16.30 parts) of Propasol P; pigments are dispersed in this mixture by ball milling.

Preparation of the Complete Primer

To the millbase is added the balance (26.7 parts) of the epoxy alkanol amine resin is added followed by the balance (3.2 parts) of the butylated melamine resin. Then, 1.04 parts of glacial acetic acid, the amount required to achieve 75% neutralization of the epoxy alkanol amine resin, in 10 parts of distilled water is added slowly with stirring. The balance of the water is then added gradually under vigorous stirring over a period of 5 minutes. The resulting fully formulated primer is filtered, applied to cold rolled, unphosphated steel panels by spraying and cured at 180° C. for 20 minutes. The cured coating displays excellent corrosion resistance in salt spray, good solvent resistance to xylene and good flexibility and hardness.

(b) Following the procedures of Example XXVII(a), the melamine resin (RN602) is replaced by the same parts by weight of LTX-127 (a product of Monsanto which is a partially methylated melamine) and equivalent film properties are achieved and the fully formulated primer exhibits superior dispersion stability as compared to the primer of (a).

(c) Following the procedures of Example XXVII(a), the melamine resin (RN602) is replaced by equal parts by weight of Cymel 1141 (a product of American Cyanamide) and equivalent film properties are obtained and the fully formulated primer exhibits superior dispersion stability as compared to the primer of (a).

What is claimed is:

1. A water dilutable primer concentrate that provides upon intimate admixture with water a primer composition which retards corrosion even in substantial absence of chromate corrosion inhibiting pigments and which comprises an intimate admixture of film forming ingredients which consist essentially of:

(A) A substantially gel free epoxy and amine reaction product which contains no ester linkages and which is made by reacting in non-aqueous water miscible medium reactants consisting essentially of:
   1. An epoxy reactant having two 1,2-epoxy groups per molecule which is the reaction product of bisphenol A and epichlorohydrin and has an epoxide equivalent weight range from at least about 875 to 4,000; and
   2. A water soluble amine reactant selected from the group consisting of secondary monoamines having a total of up to about 20 carbons, and comprising at least about 90 mole percent secondary hydroxy amine that has two or more alkyl groups each bearing a primary hydroxy group in a stoichiometric amount such that the reaction product (A) comprises tertiary amino and primary and secondary hydroxy groups and is substantially free of unreacted epoxy groups;

(B) An amino aldehyde resin crosslinking agent at about 5–30% by weight of A; and (C) Non-chromate pigment at a weight ratio of A+B+C of about 40:60 to 60:40, wherein a mixture of A, B, and C is neutralized at least partially with D a weak organic acid.

2. The primer concentrate in accordance with claim 1, wherein the amine reactant is a dialkanol amine having up to about 10 carbons.

3. The primer concentrate in accordance with claim 1 or 2, wherein the amino aldehyde crosslinking agent comprises alkylated melamine resin.

4. The primer concentrate in accordance with claim 3, wherein the water miscible medium comprises a compound selected from $R(OC_x)_y$-OH wherein R is $C_1$-$C_8$ alkyl, X is 2–4, and y is 1–10 which boils below about 180° C.

5. The primer concentrate in accordance with claim 4, wherein the acid is selected from any of formic, acetic or oxalic acids.

* * * * *